US011199132B2

(12) United States Patent
Diaz et al.

(10) Patent No.: US 11,199,132 B2
(45) Date of Patent: Dec. 14, 2021

(54) AIR INTAKE SYSTEMS AND METHODS OF ASSEMBLY THEREOF

(71) Applicant: General Electric Company, Schenectady, NY (US)

(72) Inventors: Carlos Enrique Diaz, Bayern (DE); Alvaro Enrique Hernandez, Wichita, KS (US); Mehdi Milani Baladi, Turin (IT); David William Kimball, Wichita, KS (US)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 16/326,783

(22) PCT Filed: Aug. 8, 2017

(86) PCT No.: PCT/US2017/045881
§ 371 (c)(1),
(2) Date: Feb. 20, 2019

(87) PCT Pub. No.: WO2018/038909
PCT Pub. Date: Mar. 1, 2018

(65) Prior Publication Data
US 2019/0195128 A1    Jun. 27, 2019

(30) Foreign Application Priority Data
Aug. 22, 2016    (IT) .......................... 102016000086511

(51) Int. Cl.
*F02C 7/042*    (2006.01)
*B64D 29/00*    (2006.01)
*F03G 7/06*    (2006.01)

(52) U.S. Cl.
CPC .............. *F02C 7/042* (2013.01); *B64D 29/00* (2013.01); *F03G 7/065* (2013.01); *B64D 2241/00* (2013.01)

(58) Field of Classification Search
CPC .................................. F03G 7/065; F02C 7/042
See application file for complete search history.

(56) References Cited

U.S. PATENT DOCUMENTS

| 4,674,704 | A | 6/1987 | Altoz et al. |
| 5,033,693 | A | 7/1991 | Livingston et al. |

(Continued)

FOREIGN PATENT DOCUMENTS

| EP | 0358347 A2 | 3/1990 |
| EP | 0514119 A1 | 11/1992 |

(Continued)

OTHER PUBLICATIONS

Daynes et al., "Design of a Bi-stable Morphing Composite Air Intake", RMIT University, School of Aerospace, Mechanical and Manufacturing Engineering, 18th Asia Pacific Automotive Engineering Conference, pp. 1-18, Mar. 10, 2015.

(Continued)

*Primary Examiner* — Katheryn A Malatek
(74) *Attorney, Agent, or Firm* — Dority & Manning, P.A.

(57) ABSTRACT

An air intake system includes an exterior housing for a vehicle, the exterior housing including an outer surface including a recessed portion defined therein. The recessed portion includes an angled bottom member having a first end and a second end that is coupled to the outer surface. The recessed portion further includes a first sidewall, a second sidewall opposing the first sidewall, and an inlet opening defined within the recessed portion. The inlet opening is bounded by the first sidewall, the second sidewall, and the second end, and the inlet opening is configured to receive a (Continued)

fluid stream therethrough. The air intake system further includes an actuation component coupled to the angled bottom member. The actuation component includes a shape memory alloy, and the actuation component is responsive to a change in a thermal condition and configured to move the second end, thereby regulating the inlet opening.

20 Claims, 8 Drawing Sheets

(56) References Cited

U.S. PATENT DOCUMENTS

| | | | |
|---|---|---|---|
| 5,316,437 A | 5/1994 | Czachor | |
| 5,686,003 A | 11/1997 | Ingram et al. | |
| 6,089,505 A * | 7/2000 | Gruensfelder | F02C 7/042 |
| | | | 244/53 B |
| 7,340,883 B2 | 3/2008 | Wood et al. | |
| 7,597,616 B2 | 10/2009 | Browne et al. | |
| 8,172,178 B2 * | 5/2012 | Bonnaud | B64C 23/06 |
| | | | 244/117 A |
| 8,191,826 B2 | 6/2012 | Daynes et al. | |
| 8,371,324 B1 * | 2/2013 | Fink | F02C 7/042 |
| | | | 137/15.1 |
| 8,393,566 B2 | 3/2013 | Suercke et al. | |
| 8,991,191 B2 | 3/2015 | Diaz et al. | |
| 9,108,737 B2 | 8/2015 | Zysman | |
| 9,409,653 B2 | 8/2016 | Ahmad et al. | |
| 2005/0022866 A1 | 2/2005 | Sakurai et al. | |
| 2005/0274103 A1 * | 12/2005 | Prasad | B64D 33/02 |
| | | | 60/226.1 |
| 2006/0101807 A1 * | 5/2006 | Wood | B64C 7/02 |
| | | | 60/262 |
| 2007/0117501 A1 | 5/2007 | Solntsev et al. | |
| 2009/0056307 A1 | 3/2009 | Mons | |
| 2011/0038727 A1 | 2/2011 | Vos et al. | |
| 2015/0083367 A1 * | 3/2015 | Diaz | F02C 7/18 |
| | | | 165/103 |
| 2015/0167552 A1 | 6/2015 | Prouteau et al. | |
| 2015/0315999 A1 * | 11/2015 | Werner | F02K 1/15 |
| | | | 239/11 |
| 2016/0084165 A1 | 3/2016 | Packard et al. | |

FOREIGN PATENT DOCUMENTS

| | | |
|---|---|---|
| EP | 2927129 A1 | 10/2015 |
| FR | 2879564 A1 | 6/2006 |
| FR | 2936778 A1 | 4/2010 |

OTHER PUBLICATIONS

Italian Search Report and Written Opinion dated Apr. 24, 2017 which was issued in connection with IT102016000086511 which was filed on Aug. 22, 2016.

Edward V. White: Defense System Perspectives on Multi-functional Design for Actuation Workshop: Aug. 3, 2012, Hilton Arlington, 950 North Stafford Street, Arlington VA 11103 p. 5.

International Search Report and Written Opinion dated Nov. 9, 2017 which was issued in connection with PCTPCT/US17/45881 which was filed on Aug. 8, 2017.

* cited by examiner

AIR INTAKE SYSTEMS AND METHODS OF ASSEMBLY THEREOF

BACKGROUND

The field of the disclosure relates generally to aircrafts and other high speed vehicles and, more specifically, to air intake systems and methods of assembly thereof.

Known aircraft turbofans have many compartments associated therein that are subject to heating during operation. These turbofans typically include a fan, a low pressure compressor, a high pressure compressor, a combustor, a high pressure turbine, and a low pressure turbine. The high pressure compressor, combustor, and high pressure turbine are collectively referred to as a core engine. An engine nacelle system for the engine extends circumferentially around the engine, sheltering the engine and providing aerodynamic surfaces which cooperate with the turbofans for generating thrust. A typical engine nacelle system includes a fan compartment surrounding a fan case and a core nacelle surrounding the core engine. The core nacelle is radially spaced apart from the core engine and a core compartment extending around the core engine is located therebetween.

To cool these known enclosures and/or compartments, as well as others, some known turbofans include air inlet ducts disposed on an exterior of the engine nacelle system to facilitate channeling a stream of air therethrough. Inlet ducts include flush inlets and raised scoop inlets. A typical flush inlet is known as a National Advisory Committee for Aeronautics (NACA) inlet duct. NACA inlet ducts include a shallow ramp with curved sidewalls recessed into an exterior surface of a streamlined body, such as the engine nacelle system. However, all these ducts typically have a fixed inlet opening that is sized to provide cooling for hot operating conditions, for example aircraft ground idle or take off, and thus are generally oversized for other operating conditions, and for example aircraft cruise.

Some known NACA inlet ducts regulate cooling flow through the air inlets using a mechanical valve and actuator assembly, with a valve position determined by a Full Authority Digital Engine (or Electronics) Control (FADEC). However, these mechanical systems add to engine weight and require power to operate, thereby increasing the difficulty of operation during soak back conditions, e.g., when components remain in operation for a period of time after engine shutdown.

BRIEF DESCRIPTION

In one aspect, an air intake system is provided. The air intake system includes an exterior housing for a vehicle. The exterior housing includes an outer surface including a recessed portion. The recessed portion includes an angled bottom member including a first end and a second end, the angled bottom member is coupled to the outer surface at the first end. At least a portion of the angled bottom member is movable within the recessed portion. The recess further includes a first sidewall extending from the first end to the second end. A second sidewall extends from the first end to the second end and the second sidewall opposes the first sidewall, and an inlet opening is defined within the recessed portion adjacent the second end. The inlet opening is bounded by the first sidewall, the second sidewall, and the second end, and the inlet opening is configured to receive a fluid stream therethrough. The air intake system further includes an actuation component coupled to the angled bottom member. The actuation component includes a shape memory alloy, and the actuation component is responsive to a change in a thermal condition and configured to move the second end, thereby regulating the inlet opening.

In another aspect, an air intake system is provided. The air intake system includes an exterior housing for a vehicle. The exterior housing includes an outer surface including a recessed portion. A scoop cover coupled to the outer surface above the recessed portion. The scoop cover includes an angled top member including a first end and a second end, said angled top member coupled to and extending from the outer surface at the second end. The first end and the outer surface define an inlet opening configured to receive a fluid stream therethrough. At least a portion of the angled top member is movable with respect to the outer surface. The air intake system further includes an actuation component coupled to the angled top member. The actuation component includes a shape memory alloy, and the actuation component is responsive to a change in a thermal condition and configured to move the first end, thereby regulating the inlet opening.

In still another aspect, a method of assembling an air intake system is provided. The method includes defining a recessed portion within an outer surface of an exterior housing of a vehicle. The recessed portion includes an angled bottom member including a first end and a second end, a first sidewall extending from the first end to the second end, and a second sidewall extending from the first end to the second end and opposing the first sidewall. Coupling the angled bottom member to the outer surface such that the angled bottom member extends from the outer surface at the first end and at least a portion of the angled bottom member is movable with the recessed portion. Defining an inlet opening within the recessed portion adjacent the second end, the inlet opening bounded by the first sidewall, the second sidewall, and the second end, and configured to receive a fluid stream therethrough. The method further includes coupling an actuation component to the angled bottom member. The actuation component includes a shape memory alloy, the actuation component responsive to a change in a thermal condition and configured to move the second end, thereby regulating the inlet opening.

DRAWINGS

These and other features, aspects, and advantages of the present disclosure will become better understood when the following detailed description is read with reference to the accompanying drawings in which like characters represent like parts throughout the drawings, wherein.

Figure 1:
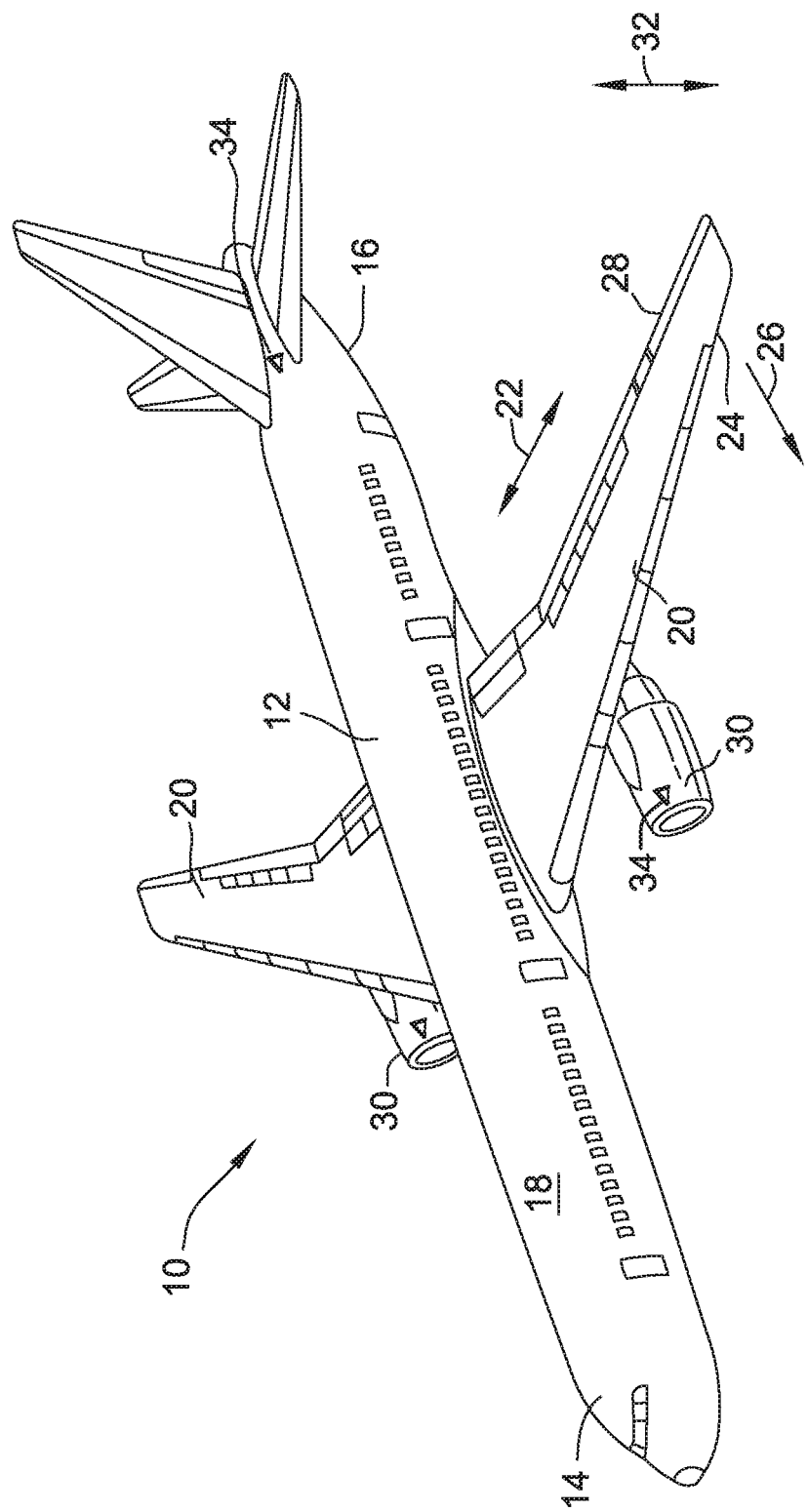
FIG. 1 is a perspective view of an exemplary aircraft.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine or forward moving direction of the vehicle. In addition, as used herein, the terms "circumferential" and "circumferentially" refer to directions and orientations extending arcuately about a longitudinal axis of the gas turbine engine.

Embodiments of the present disclosure relate to passive air inlet systems that facilitate a regulated inlet opening. Specifically, in the exemplary embodiments, an air intake system includes a recessed portion defined within an outer surface of an aircraft. The recessed portion includes a shallow ramp bounded by sidewalls such that air is channeled into an inlet opening and a cooling duct. The air intake system further includes an actuation component coupled to the ramp. The actuation and sensing component includes a shape memory alloy, such that the actuation component is passively responsive to a change in a thermal conditions to move the ramp within the recessed portion and regulate the size of the inlet opening. In some embodiments, the shape memory alloy includes a wire coupled to the ramp. In other embodiments, the shape memory alloy includes a spring coupled to the ramp. In further embodiments, the shape memory alloy is embedded within the ramp. In all embodiments, the shape memory alloy is responsive to thermal conditions such that the inlet opening increases in size in higher temperatures and the inlet opening decreases in size in lower temperatures. By regulating the inlet opening, and thereby air intake, a more efficient system is provided for various aircraft operating conditions.

FIG. 1 is a perspective view of an exemplary vehicle and specifically an aircraft 10. In alternative embodiments, vehicle includes, for example and without limitation, to an automobile. In the exemplary embodiment, aircraft 10 includes a fuselage 12 that includes a nose 14, a tail 16, and a hollow, elongate body 18 extending therebetween. Aircraft 10 also includes a wing 20 extending away from fuselage 12 in a lateral direction 22. Wing 20 includes a forward leading edge 24 in a direction 26 of motion of aircraft 10 during normal flight and an aft trailing edge 28 on an opposing edge of wing 20. Aircraft 10 further includes at least one engine 30 configured to drive a bladed rotatable member or fan to generate thrust. Engine 30 is coupled to at least one of wing 20 and fuselage 12, for example, in a pusher configuration (not shown) proximate tail 16. In the exemplary embodiment, engine 30 is coupled to wing 20 below wing 20 in a vertical direction 32. Vertical direction 32 is defined relative to the direction aircraft 10 is oriented when stationary on the ground. Down, vertically lower, or below refers to the side of aircraft 10 facing the ground when aircraft 10 has weight on wheels. Up, vertically upper, or above refers to the side of aircraft 10 opposite down, vertically lower, or below. Engine 30 is not limited to wing-mount engines as depicted in FIG. 1. Engine 30 may also include engines installed over wing 20, engines installed to fuselage 12, or engines installed within fuselage 12. Additionally, aircraft 10 includes at least one air intake system 34 that will be described if further detail below.

Figure 2:
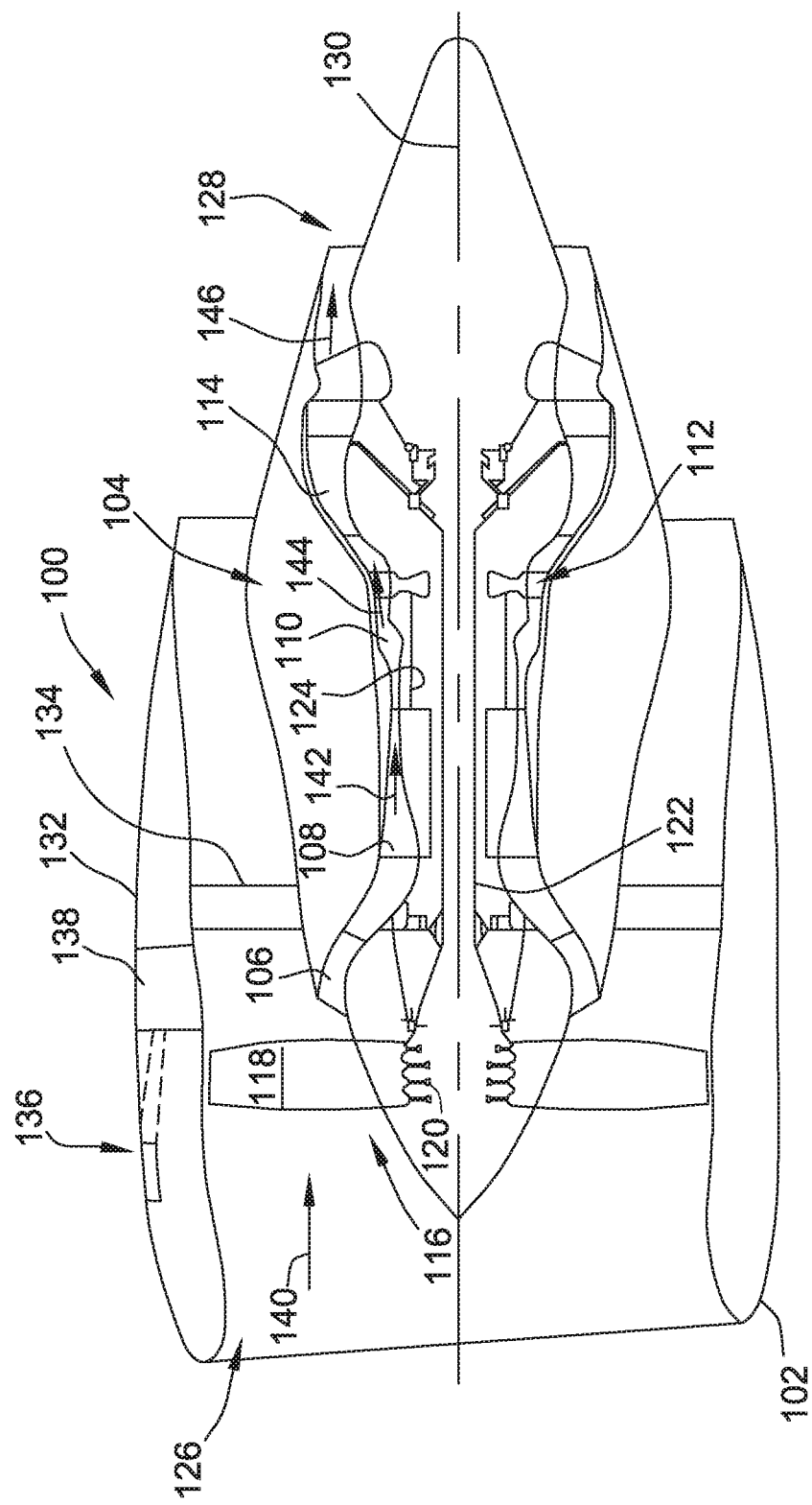
FIG. 2 is a schematic view of an exemplary turbofan, i.e., a gas turbine engine that may be used with the aircraft shown in FIG. 1.

FIG. 2 is a schematic view of a rotary machine 100, e.g., a turbomachine, and more specifically, a turbofan engine. In the exemplary embodiment, turbofan engine 100 is a high-bypass turbofan jet engine. Alternatively, turbofan engine 100 is any other turbine engine, including, and without limitation, a turboprop engine, and a military purpose engine. In the exemplary embodiment, turbofan engine 100 includes a fan case assembly 102 and a gas turbine engine 104 disposed downstream from fan case assembly 102. Gas turbine engine 104 includes a low pressure or booster compressor 106, a high-pressure compressor 108, and a combustor 110. Booster compressor 106, high-pressure compressor 108, and combustor 110 are coupled in flow communication. Gas turbine engine 104 also includes a high-pressure turbine 112 coupled in flow communication with combustor 110 and a low-pressure turbine 114. Turbofan engine 100 also includes a fan assembly 116 that includes an array of fan blades 118 extending radially outward from a rotor disk 120. Low-pressure turbine 114 is coupled to fan assembly 116 and booster compressor 106 via a first drive shaft 122, and high-pressure turbine 112 is coupled to high-pressure compressor 108 via a second drive shaft 124. Turbofan engine 100 has an intake 126 and an exhaust 128. Turbofan engine 100 further includes a centerline 130 about which fan assembly 116, booster compressor 106, high-pressure compressor 108, and turbine assemblies 112 and 114 rotate.

In the exemplary embodiment, fan case assembly 102 includes an annular fan casing or outer nacelle 132 that circumferentially surrounds fan assembly 116 and/or at least a portion of gas turbine engine 104. Nacelle 132 is supported relative to gas turbine engine 104 by an outlet guide vane assembly 134.

Additionally, an air intake system 136, such as air intake system 34 (shown in FIG. 1), is formed within nacelle 132. In the exemplary embodiment, air intake system 136 is positioned on an outer surface of nacelle 132 and facilitates removing heat from a compartment 138 therein. Air intake system 136 will be discussed in further detail below in reference to FIG. 3. In the exemplary embodiment, air intake system 136 is coupled to turbofan engine 100. In alternative embodiments, air intake system 136 is coupled to other surfaces of aircraft 10 (shown in FIG. 1), for example, fuselage 12 (shown in FIG. 1).

In operation, intake 126 channels air 140 through fan assembly 102, as well as, booster compressor 106 and high-pressure compressor 108. Compressors 106 and 108 compresses inlet air 140 to higher pressures prior to discharging compressed air 142 towards combustor 110. Compressed air 142 is channeled to combustor 110 where it is mixed with fuel (not shown) and burned to generate high temperature combustion gases 144. Combustion gases 144 are channeled downstream towards high-pressure turbine 112 and low-pressure turbine 114, such that after impinging turbine blades (not shown) thermal energy is converted to mechanical rotational energy that is used to drive first drive shaft 122 and second drive shaft 124 respectively about centerline 130. Exhaust gases 146 then discharge through exhaust 128 to ambient atmosphere.

Figure 3:
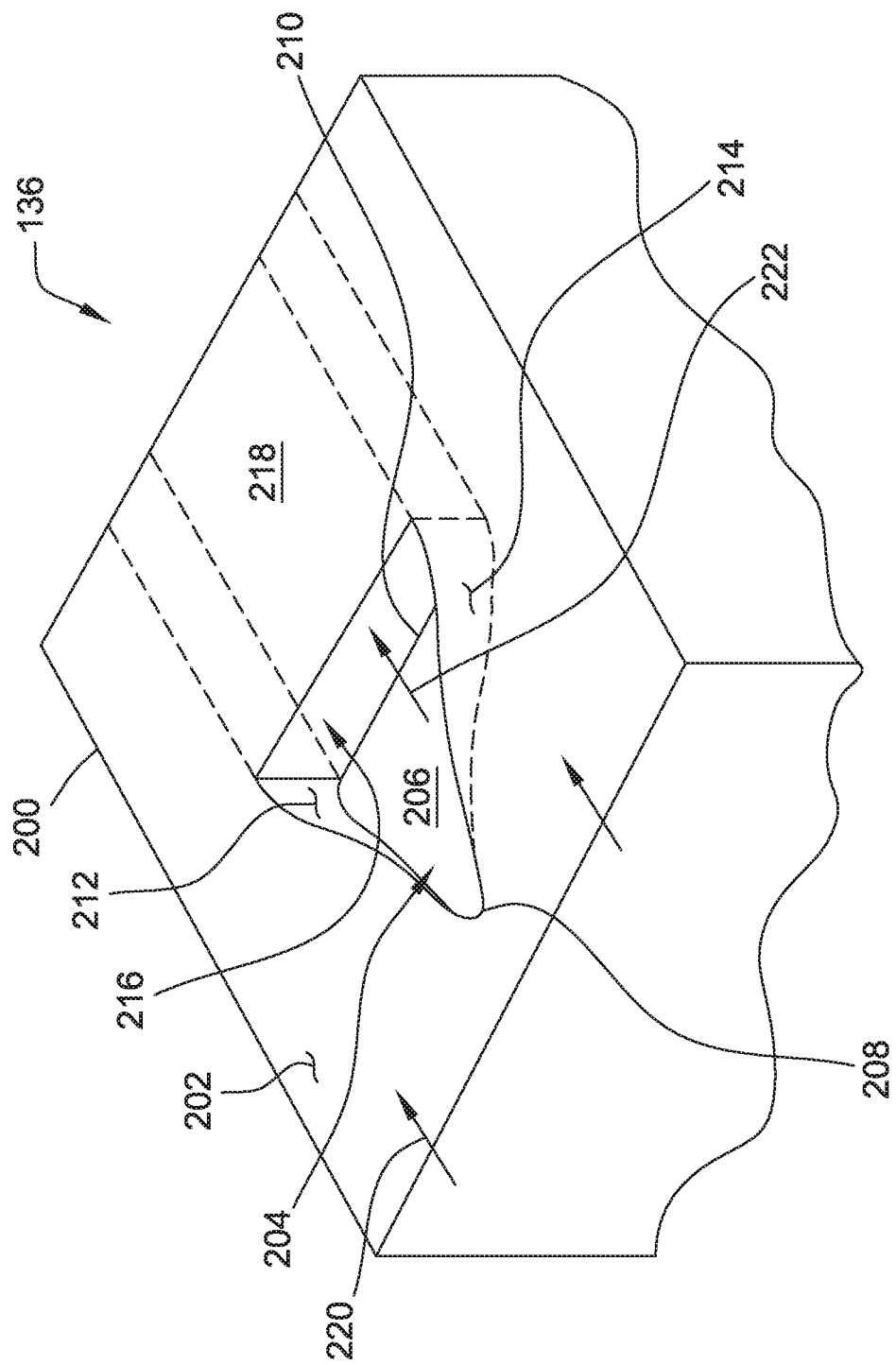
FIG. 3 is a perspective view of an exemplary air intake system that may be used with the turbofan shown in FIG. 2.

FIG. 3 is a perspective view of exemplary air intake system 136 that may be used with turbofan engine 100 (shown in FIG. 2). In the exemplary embodiment, air intake system 136 is formed within an exterior housing 200 including an outer surface 202. Exterior housing 200 includes, for example, nacelle 132 (shown in FIG. 2) and/or fuselage 12 (shown in FIG. 1). A recessed portion 204 is defined in exterior housing 200. Recessed portion 204 includes an angled bottom member 206 that has a first end 208 and an opposite second end 210. Angled bottom member 206 is coupled to outer surface 202 at first end 208 and extends in an inward sloping direction from outer surface 202 to second end 210 positioned within exterior housing 200. Recessed portion 204 further includes a first sidewall 212 that extends from first end 208 to second end 210, and a second sidewall 214 that extends from first end 208 to second end 210 and opposite first sidewall 212. An inlet opening 216 is defined within exterior housing 200 such that a cooling duct 218 is formed within exterior housing 200. Inlet opening 216 is bounded by first sidewall 212, second sidewall 214, second end 210 of angled bottom member 206, and outer surface 202.

In the exemplary embodiment, air intake system 136 is a flush National Advisory Committee for Aeronautics (NACA) shaped inlet. As such, angled bottom member 206 is shaped such that it conforms to the NACA inlet profile. In alternative embodiments, air intake system 136 has any other inlet shape, for example and without limitations, rectangular, such that angled bottom member 206 has a rectangular shape, and elliptical, such that angled bottom member 206 has an elliptical shape.

In operation, air intake system 136 is positioned on an exterior surface of aircraft 10 (shown in FIG. 1), for example, on nacelle 132 and/or fuselage 12. During movement of aircraft 10, a stream of air 220 is channeled over exterior housing 200 and outer surface 202. Recessed portion 204 facilitates channeling a portion 222 of air 220 into exterior housing 200 though inlet opening 216, where air stream 222 is channeled through cooling duct 218 to interior enclosures and/or chambers for cooling therein. When aircraft 10 is not moving, inlet opening 216 and duct 218 operate as an outlet opening to facilitate a flow path for venting and releasing heat from the interior enclosures and/or chambers.

Figure 4:
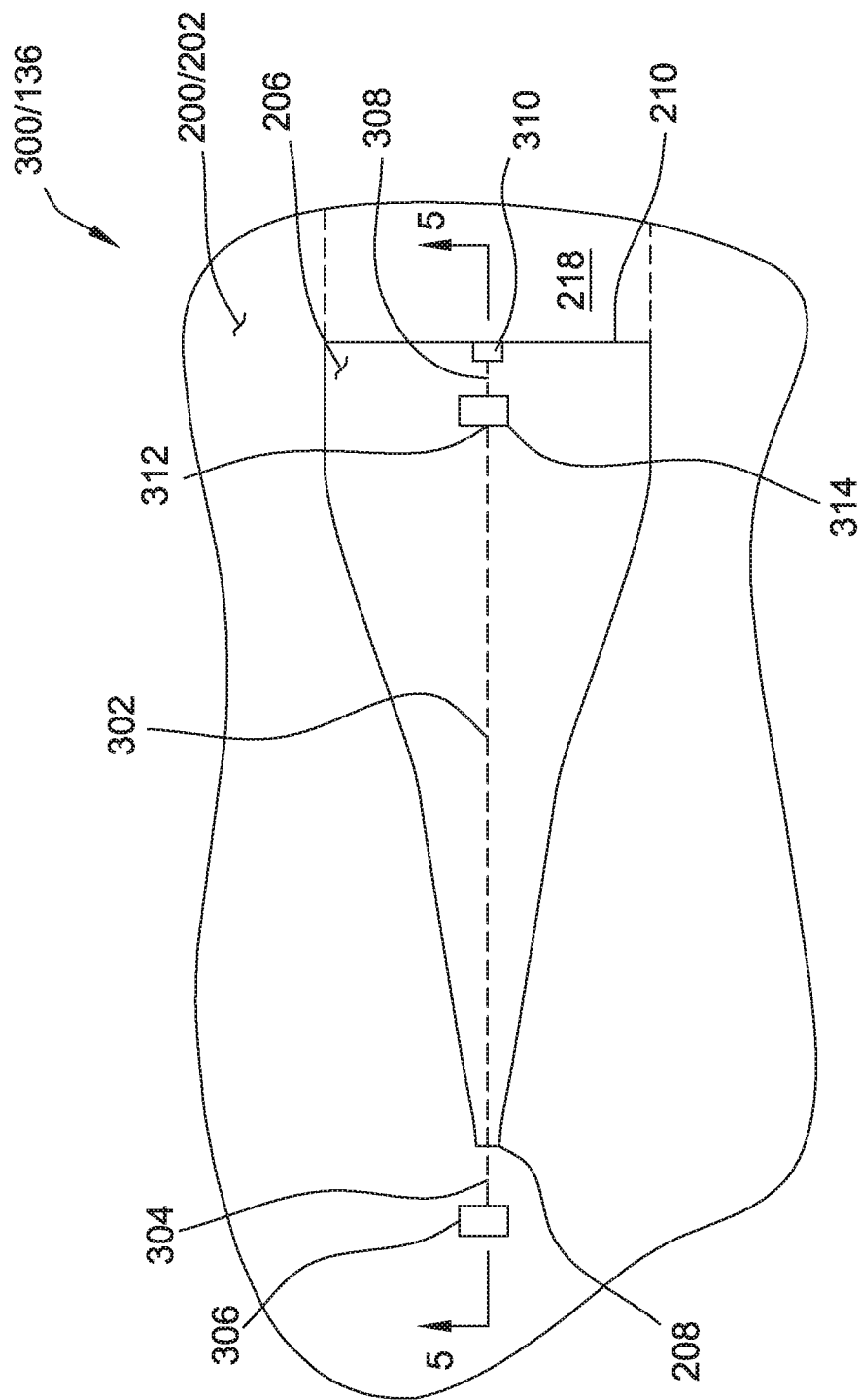
FIG. 4 is a plan view of an exemplary actuation component that may be used with the air intake system shown in FIG. 3.

FIG. 4 is a plan view of an exemplary actuation component 300 that may be used with air intake system 136 (shown in FIG. 3). In the exemplary embodiment, actuation component 300 includes a shape memory alloy (SMA) wire 302 coupled to angled bottom member 206. SMA is an alloy, such as a Nickel-Titanium alloy or a copper-aluminum-nickel alloy, which changes crystalline structure, and thereby mechanical properties, when subjected to thermal changes. For example, SMA at a lower temperature is easily deformable, and when heated, the SMA will change its mechanical properties and change shape when pre-loaded. Specifically, the higher temperature phase is known as an austenite phase that has a first crystalline structure. When heat is extracted, the SMA phase changes to a lower temperature phase that is known as a martensite phase having a second crystalline structure. The martensite phase has a modulus of elasticity that is lower than the austenitic phase. This phase change is a reversible process, and the SMA may change from the martensite phase to the austenitic phase and back again. In alternative embodiments, actuation component 300 includes any other smart material that is responsive to thermal changes, for example, shape memory polymers, that enables actuation component 300 to function as described herein.

In the exemplary embodiment, SMA wire 302 is coupled at a first end 304 to exterior housing 200 at a first position 306 adjacent to first end 208 of angled bottom member 206 and is coupled at a second end 308 to second end 210 of angled bottom member 206 at a second position 310. Additionally, a SMA wire 302 is supported by a support member 312 at a third position 314. As such, SMA wire 302 is responsive to a change in thermal conditions so as to move second end 210 of angled bottom member 206, thereby regulating inlet opening 216 (shown in FIG. 3). In the exemplary embodiment, angled bottom member 206 is a pre-tensioned cantilevered member that extends from outer surface 202 at first end 208.

Figure 5:
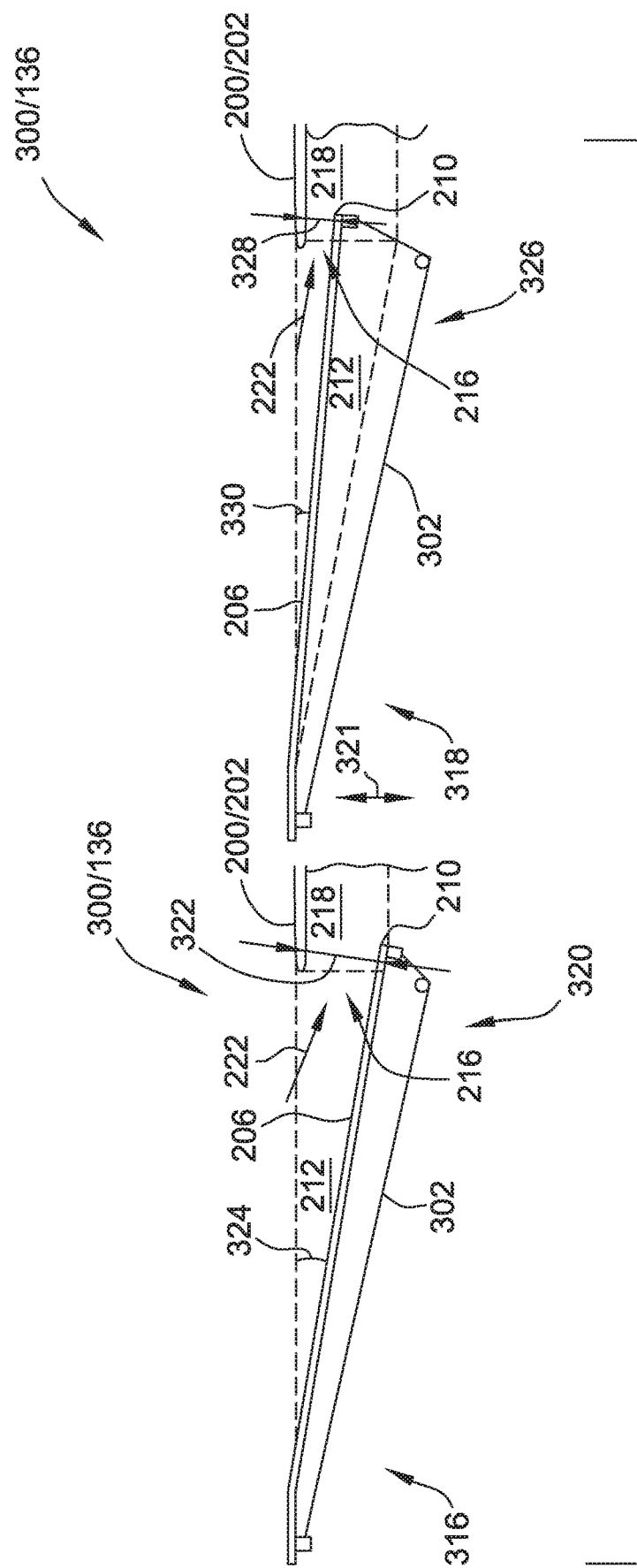
FIG. 5 is a cross-sectional view taken along line 5-5 of the actuation component shown in FIG. 4.

FIG. 5 is a cross-sectional view taken along line 5-5 of actuation component 300 (shown in FIG. 4). Actuation component 300 has an austenite position 316 and a martensite position 318. In the exemplary embodiment, austenite position 316 includes SMA wire 302 having a memory shape 320 that corresponds to a higher predetermined temperature of SMA wire 302. For example, during higher temperature operation of turbofan engine 100 (shown in FIG. 2), such as during aircraft 10 (shown in FIG. 1) take off on a hot day and below sea-level, air intake system 136 and therefore SMA wire 302 is subject to higher thermal loads such that SMA wire 302 forms in the austenite phase. As such, second end 210 of angled bottom member 206 is moved in direction 321 to a first position having a first distance 322 from outer surface 202 and corresponding to austenite position 316. In the first position, angled bottom member 206 is positioned at a first angle 324 from outer surface 202 such that inlet opening 216 increases in size, thereby facilitating a greater air stream 222 to be channeled into cooling duct 218.

In martensite position 318, SMA wire 302 has a deformed shape 326 that corresponds to a lower predetermined temperature of SMA wire 302. For example, during lower temperature turbofan engine 100 operation, such as during aircraft 10 cruise operation on a cold day at high altitude, air intake system 136 and therefore SMA wire 302 is subject to lower thermal loads such that SMA wire 302 forms in the martensite phase. As such, second end 210 of angled bottom member 206 is moved along direction 321 to a second position having a second distance 328 from outer surface 202 and corresponding to martensite position 318. In this position, second distance 328 is less than first distance 322 and second end 210 moves toward outer surface 202 because angled bottom member 206 is pre-tensioned. In the second position, angled bottom member 206 is positioned at a second angel 330 from outer surface 202 such that inlet opening 216 decreases in size, thereby facilitating a reduced air stream 222 to be channeled into cooling duct 218 and also reducing drag of air intake system 136. As such, SMA wire 302, and therefor actuation component 300, also is a sensing component that facilitates passive temperature sensing and a simultaneous actuating movement.

In alternative embodiments, actuation component 300 has two or more SMA wires 302, in parallel or in series, with different phase change temperatures. As such, instead of only two inlet opening 216 positions, more than two inlet opening 216 positions are set for further regulation of air intake system 136. For example, during turbofan engine 100 soakback conditions, which even higher temperatures can occur therein, air intake system 136 moves to a third position (not shown) that increases the size of inlet opening 216 even further to facilitate venting and cooling turbofan engine 100.

Figure 6:
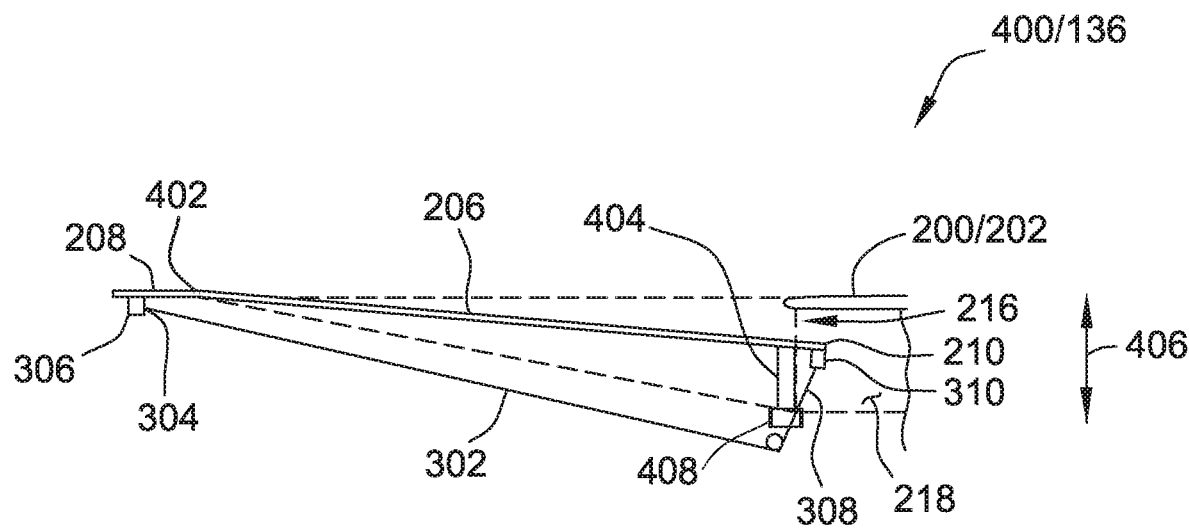
FIG. 6 is a cross-sectional view of an alternative actuation component that may be used with the air intake system shown in FIG. 3.

FIG. 6 is a cross-sectional view of an alternative actuation component 400 that may be used with air intake system 136 (shown in FIG. 3). Actuation component 400 includes SMA wire 302 coupled at first end 304 to exterior housing 200 at first position 306 adjacent to first end 208 of angled bottom member 206 and coupled at second end 308 to second end 210 of angled bottom member 206 at second position 310 similar to actuation component 300 (shown in FIGS. 4-5). However, in this embodiment, angled bottom member 206 is coupled to outer surface 202 at first end 208 through a hinge 402. To induce movement of second end 210 of angled bottom member 206 when SMA wire 302 is in the martensite phase, a bias member 404, such as a spring, is coupled to angled bottom member 206 and supported by a support member 408.

Similar to the above described embodiments, actuation component 400 SMA wire 302 is responsive to a change in thermal conditions so as to move first end 210 of angled bottom member 206 in a direction 406, thereby regulating inlet opening 216. For example, when SMA wire 302 is in the austenite phase, SMA wire 302 overcomes bias member 404. As such, the movement of second end 210 of angled bottom member 206 increases the size of inlet opening 216. When SMA wire 302 is in the martensite phase, bias member 404 overcomes SMA wire 302 and urges second end 210 of angled bottom member 206 towards outer surface 202. As such, the movement of second end 210 decreases the size of inlet opening 216. As such, stream of air 222 (shown in FIG. 3) induced through cooling duct 218 is also regulated.

Figure 7:
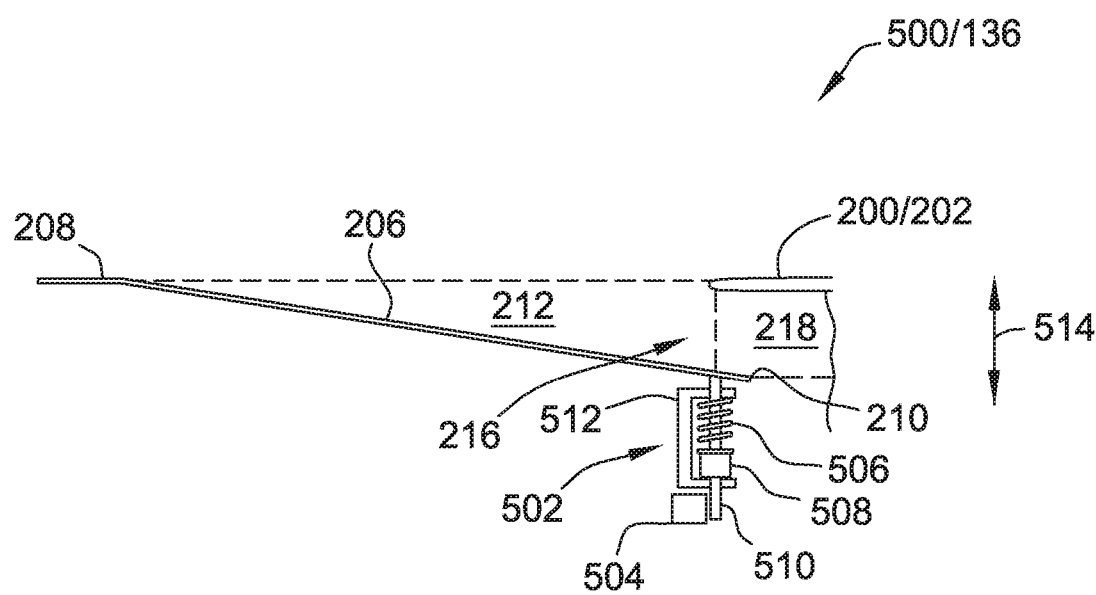
FIG. 7 is a cross-sectional view of another alternative actuation component that may be used with the air intake system shown in FIG. 3.

FIG. 7 is a cross-sectional view of another alternative actuation component 500 that may be used with air intake system 136 (shown in FIG. 3). In this embodiment, actuation component 500 includes a SMA spring assembly 502 coupled to a support 504. SMA spring assembly 502 is positioned proximate second end 210 of angled bottom member 206. SMA spring assembly 502 includes a SMA spring 506, a bias member 508, and a dowel 510 coupled to second end 210 of angled bottom member 206, all at least partially within a housing 512. SMA spring 506 is positioned over bias member 508, and dowel 510 is coupled to bias member 508 such that dowel 510 is movable with bias member 508.

During operation and similar to the above described embodiments, when SMA spring 506 is in the austenite phase, SMA spring 506 overcomes bias member 508 and depresses dowel 510 within housing 512. As such, the movement of second end 210 of angled bottom member 206 increases the size of inlet opening 216 in a direction 514. When SMA spring 506 is in the martensite phase, bias member 508 overcomes SMA spring 506 and urges dowel 510 and second end 210 of angled bottom member 206 towards outer surface 202. As such, the movement of second end 210 decreases the size of inlet opening 216. As such, stream of air 222 (shown in FIG. 3) induced through cooling duct 218 is also regulated.

In an alternative embodiment, angled bottom member 206 is coupled to outer surface 202 at first end 208 through a hinge, for example hinge 402 (shown in FIG. 6). As bias member 508 consistently urges dowel 510 and second end 210 of angled bottom member 206 towards outer surface 202, a separate bias member, such as bias member 404 (shown in FIG. 6), or pre-tensioning angled bottom member 206 (shown in FIG. 5) is not needed.

Figure 8:
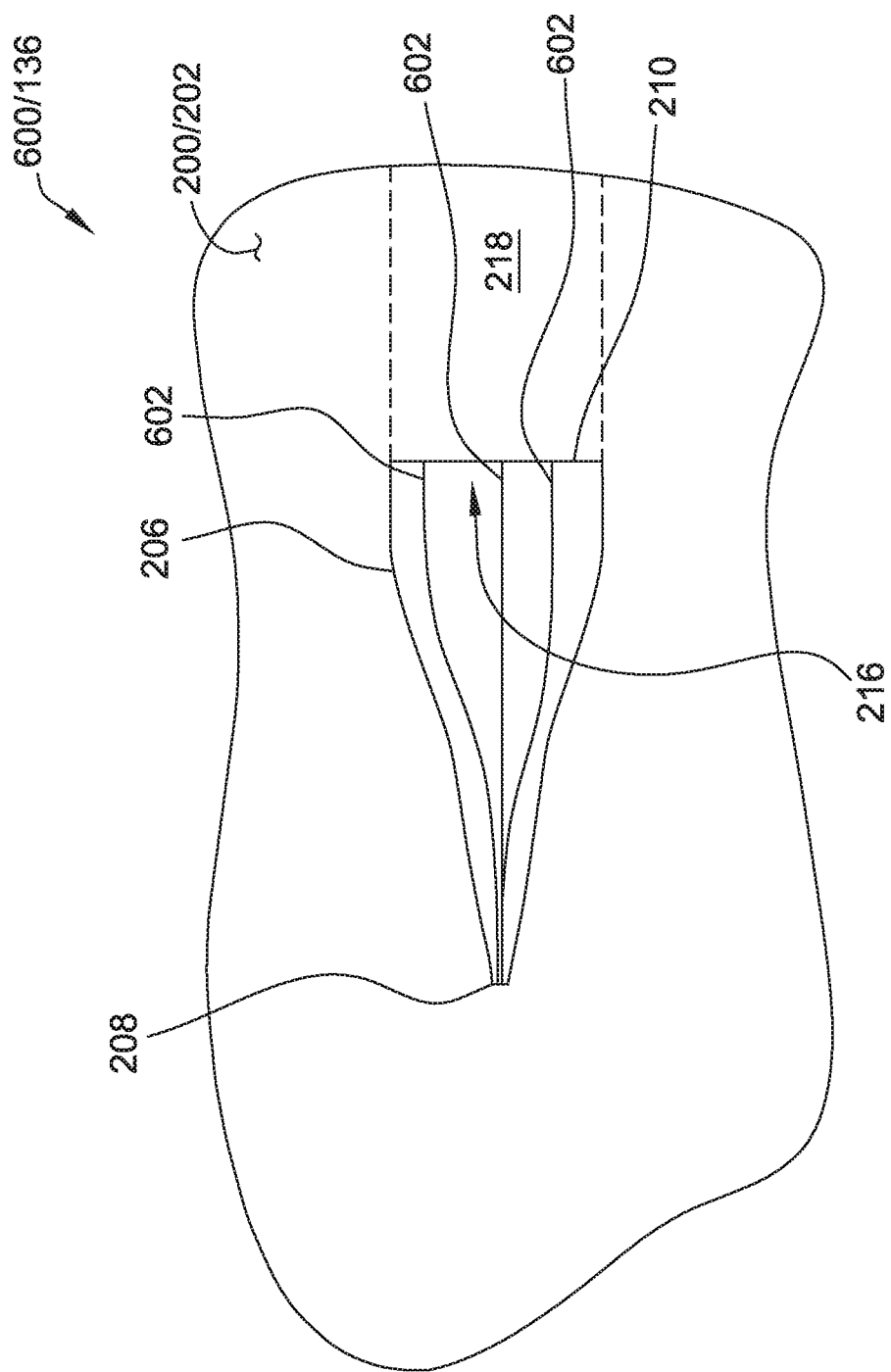
FIG. 8 is a plan view of a further alternative actuation component that may be used with the air intake system shown in FIG. 3.

FIG. 8 is a plan view of a further alternative actuation component 600 that may be used with air intake system 136 (shown in FIG. 3). In this embodiment, actuation component 600 includes a plurality of SMA wires 602 embedded within angled bottom member 206. For example, angled bottom member 206 is formed from a layered composite material with SMA wires 602 layered therein. In alternative embodiments, angled bottom member 206 is formed through any other process that enables air intake system 136 to function as described herein. Each SMA wire 602 extends from proximate first end 208 to second end 210.

During operation, angled bottom member 206 is pre-tensioned such that SMA wires 602, when in the austenite phase, overcomes the pre-tensioning and increases the size of inlet opening 216. When SMA wires 602 are in the martensite phase, the pre-tensioning urges second end 210 of angled bottom member 206 towards outer surface 202 and decreases the size of inlet opening 216. As such, stream of air 222 (shown in FIG. 3) induced through cooling duct 218 is also regulated. In alternative embodiments, a bias member is coupled to angled bottom member 206 similar to the embodiment illustrated in FIG. 6.

Figure 9:
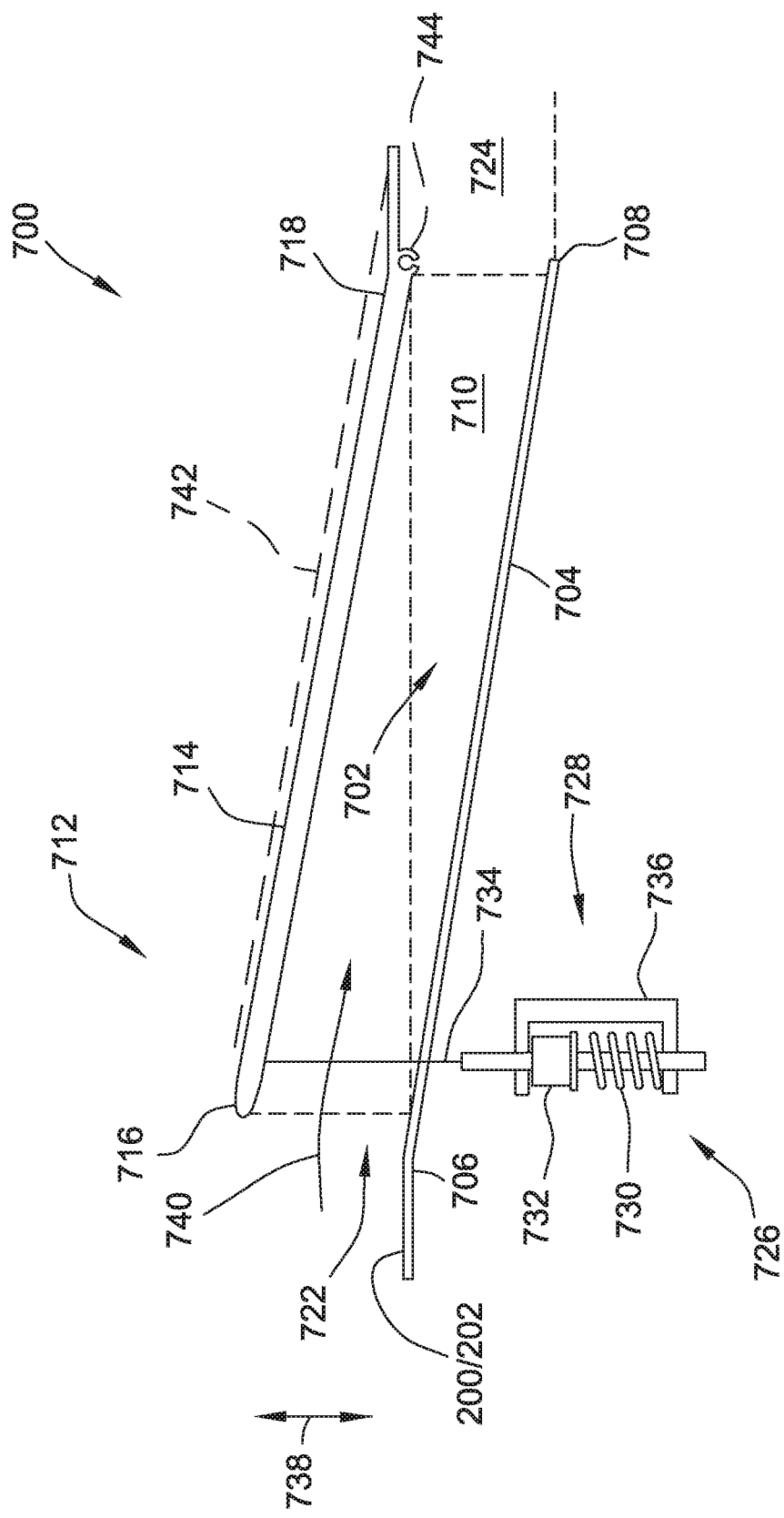
FIG. 9 is a cross-sectional view of an alternative air intake system that may be used with the turbofan shown in FIG. 2.

FIG. 9 is a cross-sectional view of an alternative air intake system 700 that may be used with turbofan engine 100 (shown in FIG. 2). Similar to the above described embodiments, air intake system 700 is formed within an exterior housing 200 including an outer surface 202. Exterior housing 200 includes, for example, nacelle 132 (shown in FIG. 2) and/or fuselage 12 (shown in FIG. 1). However, in this exemplary embodiment, air intake system 136 is a raised scoop inlet. Specifically, a recessed portion 702 is defined in exterior housing 200 and includes a static angled bottom member 704 that has a first end 706 and a second end 708. Angled bottom member 704 is coupled to outer surface 202 at first end 706 and extends in an inward sloping direction from outer surface 202 to second end 708 positioned within exterior housing 200. Recessed portion 702 further includes a first sidewall 710 that extends from first end 706 to second end 708, and an opposite second sidewall (not shown) that also extends from first end 706 to second end 708 and opposite the second sidewall. Additionally, air intake system 700 includes a scoop cover 712 coupled to outer surface 202 above angled bottom member 704 and recessed portion 702.

Scoop cover 712 includes an angled top member 714 that has a first end 716 and a second end 718. Angled top member 714 is coupled to outer surface 202 at second end 718 and extends in an outward sloping direction from outer surface 202 to first end 716. Scoop cover 712 further includes a first sidewall 720 that extends from first end 716 to second end 718, and an opposite second sidewall (not shown) that also extends from first end 716 to second end 718 and opposite first sidewall 720. An inlet opening 722 is defined within scoop cover 712 such that a cooling duct 724 is formed. Inlet opening 722 is bounded by scoop cover first sidewall 720, scoop cover second sidewall, and first end 716 of angled top member 714.

In the exemplary embodiment, air intake system 700 is a raised scoop inlet and angled top member 714 is a rectangular shape such that inlet opening 722 is also rectangular. In alternative embodiments, air intake system 700 has any other inlet opening 722 shape, for example and without limitations, circular, semi-circular, and hooded semi-circular.

Air intake system 700 further includes an actuation component 726. Actuation component 726 includes a SMA spring assembly 728, similar to SMA spring assembly 502 (shown in FIG. 7). SMA spring assembly 728 is positioned proximate first end 716 of angled top member 714 and within exterior housing 200. SMA spring assembly 728 includes a SMA spring 730, a bias member 732, and a connection member 734 coupled to first end 716 of angled top member 714, all at least partially within a housing 736.

During operation, SMA spring 730 is responsive to a change in thermal conditions so as to move first end 716 of angled top member 714 in direction 738, thereby regulating inlet opening 722. For example, when SMA spring 730 is in the austenite phase, SMA spring 730 overcomes bias member 732 and extends connection member 734 within housing 736. As such, the movement of first end 716 of angled top member 714 increases the size of inlet opening 722. When SMA spring 730 is in the martensite phase, bias member 732 overcomes SMA spring 730 and urges connection member 734 and first end 716 of angled top member 714 towards outer surface 202. As such, the movement of first end 716 decreases the size of inlet opening 722. As such, a stream of air 740 induced through cooling duct 724 is also regulated. Additionally, when decreasing the size of inlet opening 722, drag of air intake system 700 is reduced.

In alternative embodiments, air intake system 700 includes actuation components similar to the embodiments described above in reference to FIGS. 5-8. For example, similar to actuation component 300 (shown in FIG. 5), air intake system 700 includes an actuation component that includes a SMA wire 742 coupled to first end 716 of angled top member 714 at one end and to outer surface 202 at the other end. In another example, similar to actuation component 400 (shown in FIG. 6), air intake system 700 includes an actuation component that includes an SMA wire 742, and angled top member 714 is coupled to outer surface 202 through a hinge 744 and angled top member 714 is biased by a bias member (not shown). In a further example, similar to actuation component 600 (shown in FIG. 8), air intake system 700 includes an actuation component that includes a plurality of SMA wires (not shown) embedded within angled top member 714. In yet another example, air intake system 700 includes SMA spring assembly 728 positioned proximate to second end 718 of angled top member 714.

The above-described embodiments provide efficient passive air inlet system on an aircraft for regulating an inlet opening. Specifically, in the exemplary embodiments, an air intake system includes a recessed portion defined within an outer surface of an aircraft. The recessed portion includes a shallow ramp bounded by sidewalls such that air is channeled into an inlet opening and a cooling duct. The air intake system further includes an actuation component coupled to the ramp. The actuation and sensing component includes a shape memory alloy, such that the actuation component is passively responsive to a change in a thermal conditions to move the ramp within the recessed portion and regulate the size of the inlet opening. By decreasing the inlet opening size at lower temperatures, and reducing air flow within the cooling duct, the air inlet system decreases aerodynamic drag on the aircraft while still maintaining cooling requirements. Reducing drag further decreases specific fuel consumption of the aircraft. By increasing the inlet opening size at higher temperatures, and increasing air flow within the cooling duct, the air inlet system increases cooling therein without use of active cooling systems that add weight to the aircraft and require power. Additionally, the air inlet systems described herein increases cooling of an aircraft engine during soakback, when no power is available.

An exemplary technical effect of the systems and methods described herein includes at least one of: (a) passively cooling enclosures and/or compartments in an aircraft and an aircraft engine; (b) reducing drag of the air inlet system by passively regulating a size of the inlet opening; (c) decreasing specific fuel consumption of the aircraft; (d) decreasing weight of a regulated air inlet system; and (e) increasing cooling during aircraft engine soakback.

Exemplary embodiments of systems and methods for an air inlet opening are described above in detail. The methods and systems are not limited to the specific embodiments described herein, but rather, components of systems and/or steps of the methods may be utilized independently and separately from other components and/or steps described herein. For example, the method may also be used in combination with other aircraft components, and are not limited to practice only with the assemblies as described herein. Rather, the exemplary embodiments can be implemented and utilized in connection with many other aircraft applications. Additionally, the exemplary embodiments can be implements and utilized in other applications, such as automotive applications and railway/railcar applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air intake system comprising:
an exterior housing for a vehicle, said exterior housing comprising an outer surface comprising a recessed portion, said recessed portion comprising:

an angled bottom member comprising a first end and a second end, said angled bottom member coupled to said outer surface at said first end, wherein at least a portion of said angled bottom member is movable within said recessed portion;

a first sidewall extending from said first end to said second end;

a second sidewall extending from said first end to said second end, said second sidewall opposing said first sidewall; and an inlet opening defined within said recessed portion adjacent said second end, said inlet opening bounded by said first sidewall, said second sidewall, and said second end, said inlet opening configured to receive a fluid stream therethrough; and an actuation component coupled to said angled bottom member, wherein said actuation component comprises a shape memory alloy, said actuation component responsive to a change in a thermal condition and configured to move said second end, thereby regulating said inlet opening.

2. The air intake system of claim 1, wherein said actuation component is further configured to move said second end to a first position corresponding to an increased inlet opening size in response to a first predetermined temperature sensed thereon.

3. The air intake system of claim 2, wherein said actuation component is further configured to move said second end to a second position corresponding to a decreased inlet opening size in response to a second predetermined temperature sensed thereon.

4. The air intake system of claim 1, wherein said shape memory alloy comprises a shape memory alloy wire.

5. The air intake system of claim 4, wherein said shape memory alloy wire comprises a first wire end and a second wire end, said first wire end coupled adjacent said angled bottom member second end and said second wire end coupled adjacent said angled bottom member first end, and said angled bottom member is pre-tensioned.

6. The air intake system of claim 1, wherein said shape memory alloy comprises a shape memory alloy spring.

7. The air intake system of claim 6, wherein said shape memory alloy spring is coupled adjacent said angled bottom member second end.

8. The air intake system of claim 1, wherein said shape memory alloy comprises at least one shape memory alloy wire embedded within said angled bottom member.

9. The air intake system of claim 1, wherein said angled bottom member is coupled to said exterior surface through a hinge and is pre-tensioned through a bias member.

10. The air intake system of claim 1, wherein said inlet opening is configured to channel the fluid stream towards an internal cooling duct defined within said exterior housing.

11. An air intake system comprising:
an exterior housing for a vehicle, said exterior housing comprising an outer surface comprising a recessed portion;

a scoop cover coupled to said outer surface above said recessed portion, said scoop cover comprising an angled top member comprising a first end and a second end, said angled top member coupled to said outer surface at said second end, said first end and said outer surface defining an inlet opening configured to receive a fluid stream therethrough, wherein at least a portion of said angled top member is movable with respect to said outer surface; and an actuation component coupled to said angled top member, wherein said actuation component comprises a shape memory alloy, said actuation component responsive to a change in a thermal condition and configured to move said first end, thereby regulating said inlet opening.

12. The air intake system of claim 11, wherein said actuation component is further configured to move said first end to a first position corresponding to an increased inlet opening size in response to a first predetermined temperature sensed thereon.

13. The air intake system of claim 12, wherein said actuation component is further configured to move said first end to a second position corresponding to a decreased inlet opening size in response to a second predetermined temperature sensed thereon.

14. The air intake system of claim 11, wherein said shape memory alloy comprises a shape memory alloy wire.

15. The air intake system of claim 11, wherein said shape memory alloy comprises a shape memory alloy spring.

16. The air intake system of claim 11, wherein said shape memory alloy comprises at least one shape memory alloy wire embedded within said angled top member.

17. A method of assembling an air intake system comprising:
defining a recessed portion within an outer surface of an exterior housing of a vehicle, the recessed portion includes an angled bottom member including a first end and a second end, a first sidewall extending from the first end to the second end, and a second sidewall extending from the first end to the second end and opposing the first sidewall;

coupling the angled bottom member to the outer surface such that the angled bottom member extends from the outer surface at the first end and at least a portion of the angled bottom member is movable within the recessed portion;

defining an inlet opening within the recessed portion adjacent the second end, the inlet opening bounded by the first sidewall, the second sidewall, and the second end, and configured to receive a fluid stream therethrough; and coupling an actuation component to the angled bottom member, wherein the actuation component includes a shape memory alloy, the actuation component responsive to a change in a thermal condition and configured to move the second end, thereby regulating the inlet opening.

18. The method of claim 17 further comprising forming the shape memory alloy with a shape memory alloy wire.

19. The method of claim 17 further comprising forming the shape memory alloy with a shape memory alloy spring.

20. The method of claim 17 further comprising forming the shape memory alloy with at least one shape memory ally wire embedded within the angled bottom member.

* * * * *